United States Patent
Kim

Patent Number: 5,978,031
Date of Patent: Nov. 2, 1999

[54] METHOD AND APPARATUS FOR DETERMINING AN OPTIMUM GRID FOR USE IN A BLOCK-BASED VIDEO SIGNAL CODING SYSTEM

[75] Inventor: Jin-Hun Kim, Seoul, Rep. of Korea

[73] Assignee: Daewoo Electronics Co., Ltd., Rep. of Korea

[21] Appl. No.: 08/839,517

[22] Filed: Apr. 14, 1997

[30] Foreign Application Priority Data

May 23, 1996 [KR] Rep. of Korea ............... 96-17811

[51] Int. Cl.[6] .................................................. H04N 7/12
[52] U.S. Cl. ................................... 348/416; 348/421
[58] Field of Search ........................... 348/384, 390, 348/409, 415, 416, 420, 421, 422, 699, 700; 382/232, 236, 238, 243; H04N 7/12

[56] References Cited

U.S. PATENT DOCUMENTS

| | | | |
|---|---|---|---|
| 5,151,784 | 9/1992 | Lavagetto et al. | 348/416 |
| 5,173,772 | 12/1992 | Choi | 348/416 |
| 5,226,093 | 7/1993 | Iwase | 348/416 |
| 5,642,166 | 6/1997 | Shin et al. | 348/416 |
| 5,805,228 | 9/1998 | Proctor et al. | 348/422 |

OTHER PUBLICATIONS

"MPEG–4 Video Verification Model Version 2.0" International Organisation for Standardisation, ISO/IEC/JTCI/SC29/WG11 N1260, Mar. 1996.

*Primary Examiner*—Tommy P. Chin
*Assistant Examiner*—Y. Lee
*Attorney, Agent, or Firm*—Anderson Kill & Olick

[57] ABSTRACT

A method, for use in a block based video signal coding system, for determining a search grid by dividing a video object plane of an object into a plurality of equal-sized search blocks, generates a plurality of search grids, each of the search grids being relatively shifted from its adjacent search gird by a predetermined spacing, and detects edge blocks included in each search grid. Then, the method selects a search grid based on the number of the edge blocks and the pixel values in the edge blocks.

8 Claims, 2 Drawing Sheets

METHOD AND APPARATUS FOR DETERMINING AN OPTIMUM GRID FOR USE IN A BLOCK-BASED VIDEO SIGNAL CODING SYSTEM

FIELD OF THE INVENTION

The present invention relates to a method and apparatus for determining an optimum grid for use in a block-based video signal coding system; and, more particularly, to a method and apparatus for determining an optimum grid to improve the coding efficiency of the video signal representing an object image.

DESCRIPTION OF THE PRIOR ART

In digitally televised systems such as video-telephone, teleconference and high definition television systems, a large amount of digital data is needed to define each video frame since a video line signal in the video frame comprises a sequence of digital data referred to as pixel values. Since, however, the available frequency bandwidth of a conventional transmission channel is limited, in order to transmit the large amount of digital data therethrough, it is inevitable to compress or reduce the volume of data through the use of a data compression technique, especially in the case of such low bit-rate video signal encoder as video-telephone or teleconference system.

One of such techniques for encoding video signals for a low bit-rate encoding system is the so-called object-oriented analysis-synthesis coding technique wherein an input video image is divided into objects and three sets of parameters for defining the motion, contour and pixel data of each object are processed through different encoding channels.

One example of such object-oriented coding scheme is the so-called Moving Picture Experts Group (MPEG) phase 4 (MPEG-4), which is designed to provide an audio-visual coding standard for allowing content-based interactivity, improved coding efficiency and/or universal accessibility in such applications as low-bit rate communication, interactive multimedia (e.g., games, interactive TV, etc.) and area surveillance(see, for instance, MPEG-4 Video Verification Model Version 2.0, International Organization for Standardization, ISO/IEC JTC1/SC29/WG11 N1260, March 1996).

According to MPEG-4, an input video image is divided into a plurality of video object planes(VOP's), which correspond to entities in a bit-stream that a user can access and manipulate. A VOP can be referred to as an object and represented by means of a bounding rectangle whose width and height may be the smallest multiples of 16 pixels surrounding each object so that the encoder processes the input video image on a VOP-by-VOP basis, i.e., an object-by-object basis.

That is, each VOP is represented by means of a bounding rectangle; and the phase difference between the luminance (Y) and chrominance(U, V) data of the bounding rectangle has to be correctly set according to a 4:2:0 format. Specifically, since each chrominance data ia associated with four(=2×2) luminance data in the 4:2:0 format, this can be achieved by first rounding the top-left coordinates of the bounding rectangle to the nearest even numbers, e.g., (2n, 2m), not greater than the top-left coordinates, e.g., (2n+1, 2m+1), of the tightest rectangle surrounding an object, n and m being integers, respectively. The bottom-right corner of the bounding rectangle is then determined such that the width and the height of the bounding rectangle are the smallest multiples of 16 pixels.

The information on a bounding rectangle discussed in MPEG-4 includes shape information and color information consisting of luminance and chrominance data, wherein the shape information is represented by, e.g., a binary mask and related to the luminance data. In the binary mask, one binary value, e.g., 0, is used to designate a pixel located outside the object in the bounding rectangle and the other binary value, e.g., 1, is used to indicate a pixel inside the object. Therefore, the luminance data in the VOP is processed based on the binary mask, which can be referred to as luminance shape information, thereby selecting available luminance data to be encoded.

In order to process the luminance data within the bounding rectangle, the bounding rectangle is generally divided into a number of equal-sized search blocks generated by a search grid and, thereafter, the equal-sized search blocks are sequentially coded by using various block-based coding techniques, e.g., DCT coding technique and quantization, on a block-by-block basis.

Since, however, the coding efficiency is significantly affected by a boundary region of an object, it would be more desirable to reduce the number of search blocks including the boundary of the object to further reduce the volume of the digital data.

SUMMARY OF THE INVENTION

It is, therefore, a primary object of the invention to provide a method and apparatus for determining an optimum grid for a video object plane to be used in a block-based video signal coding system, capable of providing a minimum number of edge blocks, i.e., search blocks encompassing the boundary of an object, to thereby improve a coding efficiency of the video signal.

Another object of the present invention is to provide a method and apparatus for determining an optimum grid for a video object plane, which is capable of effectively providing edge blocks with a minimum mean activity, to thereby improve a coding efficiency of the video signal.

In accordance with the invention, there is provided a method and apparatus, for use in a block based video signal coding system, for determining an optimum search grid which divides a video object plane of a video signal of an object into a plurality of equal-sized search blocks, each of the search blocks having N×N pixels with N being a positive integer, which comprises the steps of:

(a) generating a plurality of search grids, wherein each of the search grids is relatively shifted from an adjacent search grid by a predetermined spacing;

(b) detecting edge blocks included in each search grid, wherein an edge block represents a search block having a portion of the boundary of the object, by using shape information of the object; and (c) selecting a search grid based on the number of the edge blocks and the pixel values in the edge blocks to determine the selected search grid as the optimum search grid.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
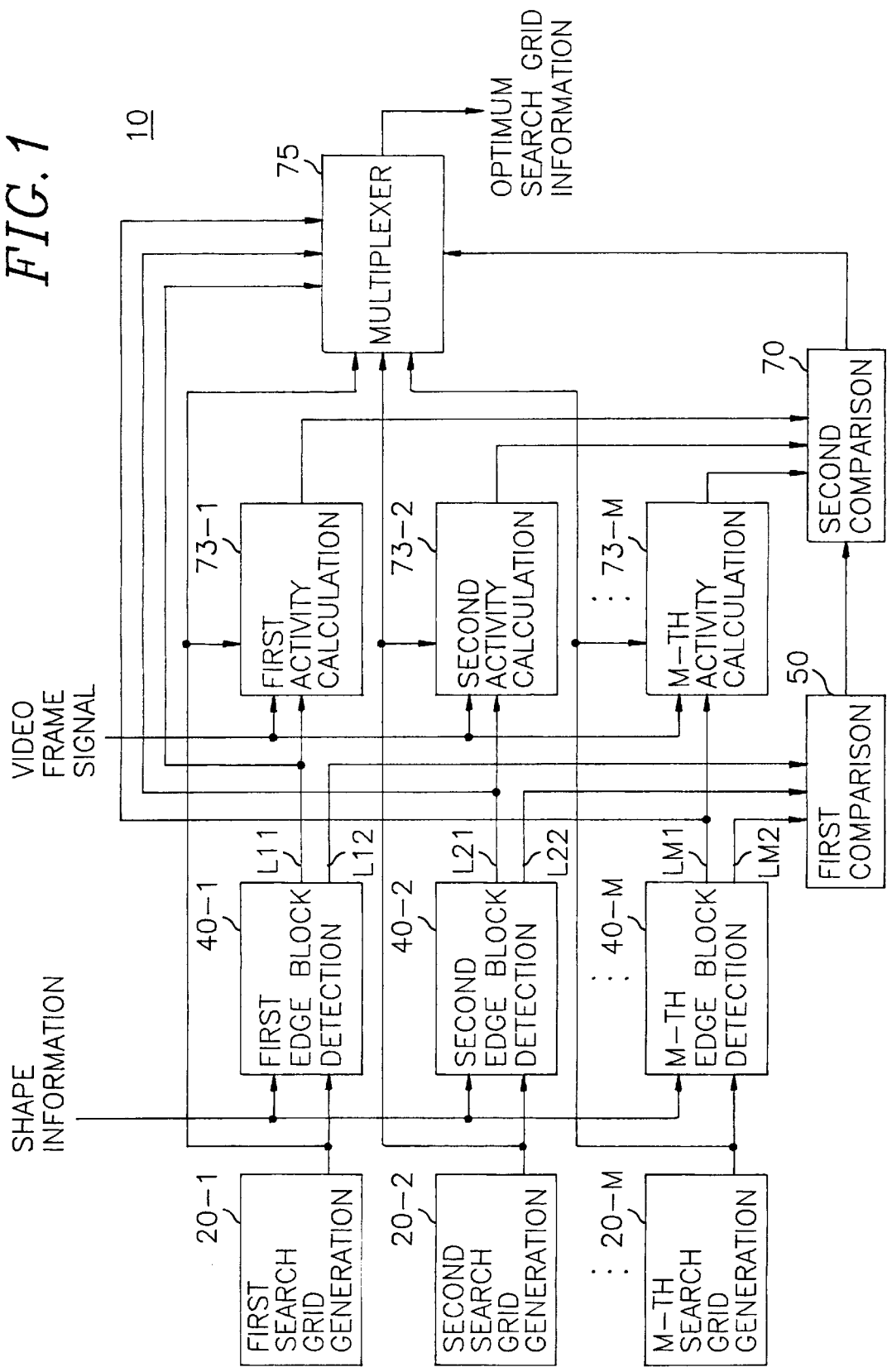
FIG. 1 is a block diagram of an apparatus for determining an optimum grid for a VOP in accordance with the present invention.

There is shown in FIG. 1 a block diagram of an apparatus 10 for determining an optimum grid for a video object plane(VOP) to be used in a block-based video signal coding system in accordance with a preferred embodiment of the present invention, wherein the apparatus 10 comprises search grid generation circuits 20-1 to 20-M, edge block detection circuits 40-1 to 40-M, activity calculation circuits 73-1 to 73-M, a first and a second comparison circuits 50, 70 and a multiplexer 75.

Shape information representing a boundary of an object is provided to each of the edge block detection circuits 40-1 to 40-M, wherein the shape information is generally expressed by using the binary mask, i.e., "0" and "1". In the meantime, video frame signals including luminance and chrominance data are relayed to each of the activity calculation circuits 73-1 to 73-M.

The search grid generation circuits 20-1 to 20-M generate a first to an Mth search grids, respectively, wherein each of the search grids may be obtained by shifting its adjacent grid by a predetermined number of pixel positions, e.g., one pixel or two pixels along the horizontal and vertical directions.

Figure 2:
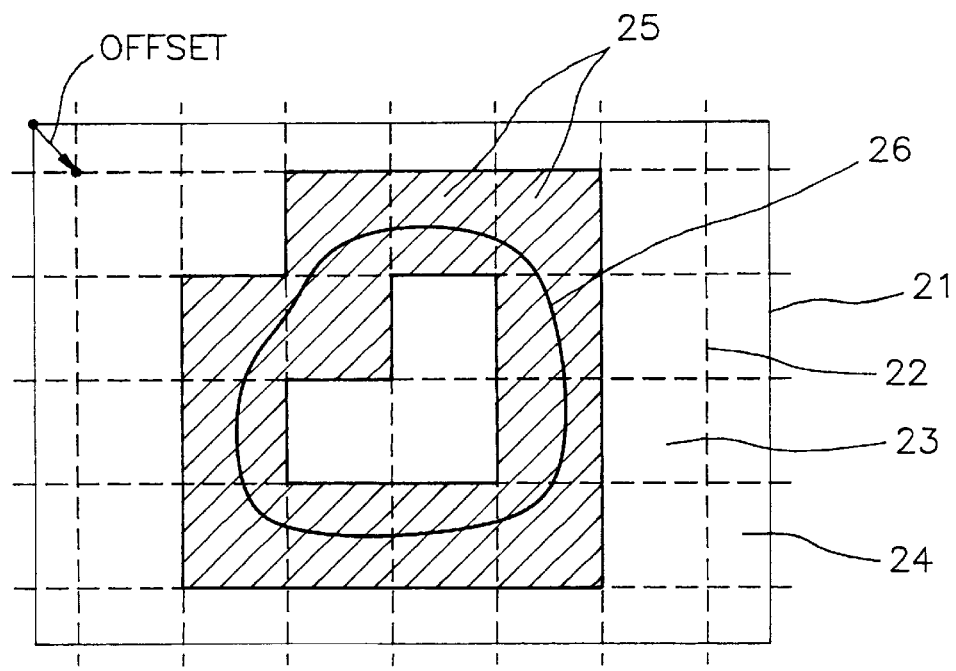
FIG. 2 shows search blocks generated by one search grid and edge blocks formed on the boundary of an object.

The search grid generation circuits 20-1 to 20-M provide search grid information, e.g., an offset for the corresponding search grid to the edge block detection circuits 40-1 to 40-M, the activity calculation circuits 73-1 to 73-M and also the multiplexer 75, respectively. Referring to FIG. 2, there is schematically illustrated an exemplary search grid 22 covering a frame 21. The search grid 22 is an infinite lattice each identical sized cell of which forms a search block 23. The search block 23 contains M pixels, M being equal to N×N, N being an integer, e.g., 8 or 16, and wherein the size M of the search block depends on the type of signals to be coded.

Figure 3:
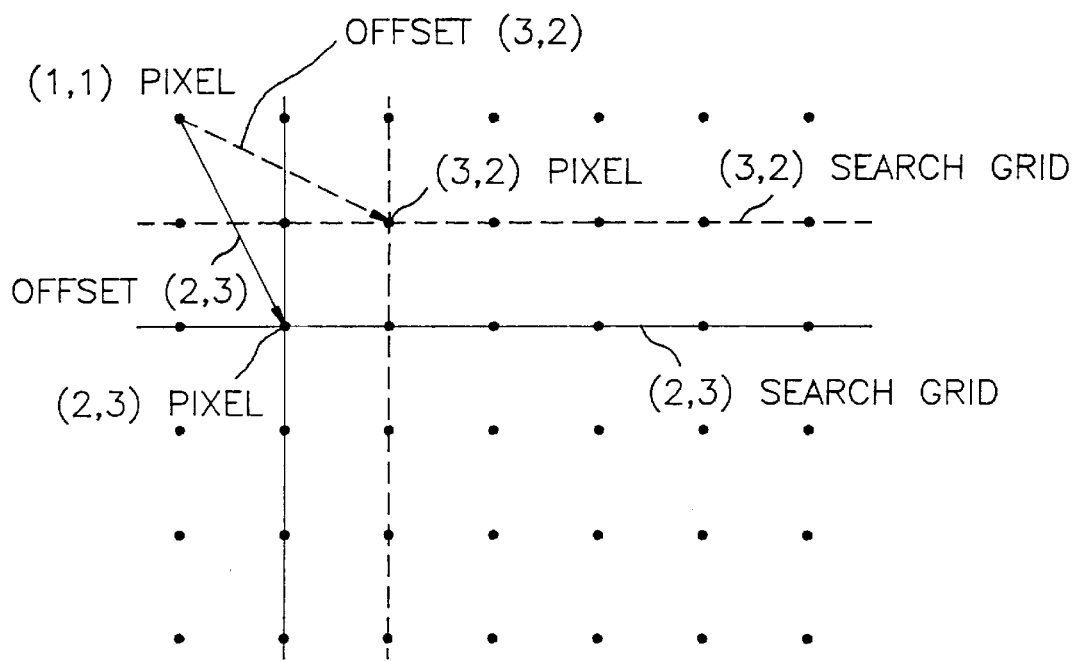
FIG. 3 represents an exemplary frame to illustrate offsets of search grids.

Since the search grid 22 can be shifted, there can be a plurality of shifted positions corresponding to a plurality of different offsets, wherein an offset is defined to represent a displacement between a farmost top-left pixel of the frame 21 and that of a farmost top-left search block of the search grid 22. Referring to FIG. 3, if (1,1) pixel of the top-leftmost search block is located at (3,2) pixel of the frame, the search grid is called (3,2) search grid corresponding to an offset (3,2). Similarly, the search grid corresponding to an offset (2,3) is called (2,3) search grid, and so on.

When the search grid is shifted, it may happen to generate incomplete search blocks 24, wherein an incomplete search block is a search block which does not have N×N pixels as shown in FIG. 2. Since the search grid can be shifted on a pixel-by-pixel basis, if one search block has N×N pixels, there can be M(=N×N) shifted search grids corresponding to M(=N×N) offsets. However, if necessary, the search grid can be shifted on two pixel-by-two pixel basis in order to encode the chrominance level in the 4:2:0 format, wherein each chrominance level is associated with four nearest luminance levels.

Even though an object may be much larger than a search block, search grids can be selected such that the object can be embraced with a minimum number of search blocks thereof.

Referring back to FIG. 1, in response to the shape information and the search grid information fed from each corresponding search grid generation circuits 20-1 to 20-M, each of the edge block detection circuits 40-1 to 40-M detects edge blocks to generate edge block information representing the locations of the edge blocks. The edge blocks 25, as shown in FIG. 2, represents search blocks including a portion of the boundary 26 of the object, i.e, in which the binary values representing the shape information are not identical. In other words, if the binary values are not identical in a search block, i.e., some binary values are "0" and some other binary values are "1", the search block is called as an edge block, but a search block in which all the binary values are identical, i.e., either all 0's or all 1's, is not an edge block.

We have singled out "edge" in this embodiment because coding efficiency is critical around the boundary of an object. In another embodiment of the invention, if necessary, we may substitute "edge" with "object". In this case, search blocks including a binary value "1" representing an object become object blocks so that object block information representing the locations of the object blocks may be generated by substituting the edge block information.

Referring back to FIG. 1, each of the edge block detection circuits 40-1 to 40-M transmits the edge block information on the corresponding search grid to each of the corresponding activity calculation circuits 73-1 to 73-M and the multiplexer 75 via lines L11 to LM1.

Each of the edge block detection circuits 40-1 to 40-M also counts the number of edge blocks on the corresponding search grid to generate an edge block number signal. If any incomplete search block contains a portion of the boundary of the object, it is preferable to assign a maximum value to the edge block number signal for the corresponding search grid so that the search grid is of little account in the next coding process because it is impossible to proceed the conventional coding on an incomplete search block. All the edge block number signals from the edge block detection circuits 40-1 to 40-M are supplied to the first comparison circuit 50 via lines L12 to LM2.

The first comparison circuit 50 compares all the edge block numbers with each other and selects a smallest number of all the edge block numbers to provide a first selection signal to the second comparison circuit 70, wherein the first selection signal represents a search grid having a minimum number of edge blocks. If more than one search grids have the same minimum number of edge blocks, all the corresponding search grids are selected and transmitted as the first selection signal to the second comparison circuit 70.

In the meantime, in response to the edge block information fed from each of the edge block detection circuits 40-1 to 40-M, each of the activity calculation circuits 73-1 to 73-M calculates an activity value for each edge block included in the corresponding search grid as follows:

$$AV = \frac{1}{M} \sum_{i=1}^{N} \sum_{j=1}^{N} (H(i, j) - m)^2$$

wherein M is equal to N×N, the number of pixels in an edge block, H(i,j) represents a pixel value, e.g., a luminance level or a chrominance level at a location(i,j) in the edge block and m is a mean pixel value for all the pixels in the edge block, i and j being positive integers no larger than the integer N, respectively. Subsequently, each of the activity calculation circuits 73-1 to 73-M calculates a mean activity values for the corresponding search grid, which represents a mean value of the activity values of all the edge blocks within the corresponding search grid.

In response to the first selection signal fed from the first comparison block 50 and all the mean activity values fed from the activity calculation circuits 73-1 to 73-M, the second comparison circuit 70 compares all the mean activity values for the search grids corresponding to the first selection signal with each other and selects a minimum mean activity value for the above search grids to provide a second selection signal to the multiplexer 75, wherein the second selection signal represents a search grid having a minimum mean activity value for the edge blocks therein.

In another preferred embodiment of the invention, if more than one search grids are selected as having the same minimum edge block number by the first comparison circuit 50, the mean activity values may be first calculated for the selected search grids only, not for all the search grids, and then a search grid having a minimum mean activity value may be selected among the selected search grids.

In response to the second selection signal, the multiplexer 75 chooses a search grid which has the minimum mean activity value among the search grids having the minimum edge block number based on the search grid information fed from each of the search grid generation circuits 20-1 to 20-M. And then the multiplexer 75, based on the edge block information fed from each of the edge block detection circuits 40-1 to 40-M, transmits the search grid information and the edge block information on the chosen search grid as an optimum search grid information for the current frame.

The optimum search grid information, e.g., Kth search grid information, is provided to a plurality of coding processors(not shown), e.g., DCT and Q processors, for coding a video signal. Therefore, at the coding processors, the coding of the video signal can be performed on a search block-by-search block basis of the optimum search grid.

While the present invention has been described with respect to the particular embodiments, it will be apparent to those skilled in the art that various changes and modifications may be made without departing from the spirit and scope of the invention as defined in the following claim.

What is claimed is:

1. A method, for use in a block-based video signal coding system, for determining an optimum search grid which divides a video object plane of a video signal of an object into a plurality of equal-sized search blocks, each of the search blocks having N×N pixels with N being a positive integer, which comprises the steps of:

(a) generating a plurality of search grids, wherein each of the search grids is relatively shifted from an adjacent search grid by a predetermined spacing;

(b) detecting edge blocks included in each search grid, wherein an edge block represents a search block having a portion of the boundary of the object, by using shape information of the object; and (c) selecting a search grid based on the number of the edge blocks and the pixel values in the edge blocks to determine the selected search grid as the optimum search grid, wherein said step (c) includes the steps of:

(c1) choosing search grids having a minimum of the edge blocks;

(c2) calculating, if a multiplicity of search grids have a same minimum number of the edge blocks, a mean activity value for each of the multiplicity of search grids based on the pixel values of the edge blocks included in said each of the multiplicity of search grids, wherein the mean activity value represents a degree of dispersion among the pixel values of the edge blocks;

(c3) detecting a search grid having a minimum mean activity value among the multiplicity of search grids; and (c4) determining the detected search grid as the optimum search grid.

2. The method as recited in claim 1, wherein said step (c2) further contains the steps of:

(c21) competing an activity value for each edge block in each search grid based on the pixel values of the edge blocks included in said each search grid, wherein each activity value for each edge block is calculated as:

$$AV = \frac{1}{M} \sum_{i=1}^{N} \sum_{j=1}^{N} (H(i,j) - m)^2$$

wherein M is the number of N×N pixels within an edge block, H(i,j) represents a pixel value at a pixel location(i,j) in the edge block, m is a mean pixel value of all the pixel values within the edge block and i and j are positive integers no larger than the integer N, respectively; and (c22) averaging all the activity values for all the edge blocks in the search grid to generate a mean activity value for the search grid.

3. The method as recited in claim 2, wherein each of the search grids is shifted from each other on a pixel-by-pixel basis.

4. The method as recited in claim 3, wherein the pixel value is a luminance level of a pixel.

5. An apparatus, for use in a block based video signal coding system, for determining an optimum search grid which divides a video object plane of a video signal of an object into a plurality of equal-sized search blocks, each of the search blocks having N×N pixels with N being a positive integer, the apparatus comprising:

means for generating a plurality of search grids, wherein each of the search grids is relatively shifted from an adjacent search grid by a predetermined spacing;

means for detecting edge blocks included in each search grid, wherein an edge block represents a search block having a portion of the boundary of the object, by using shape information of the object; and means for selecting a search grid based on the number of the edge blocks and the pixel values in the edge blocks to determine the selected search grid as the optimum search grid; wherein said selecting means includes:

means for choosing search grids having a minimum number of the edge blocks;

means for calculating, if a multiplicity of search grids have a same minimum number of the edge blocks, a mean activity value for each of the multiplicity of search grids based on the pixel values of the edge blocks included in said each of the multiplicity of search grids, wherein the mean activity value represents a degree of dispersion among the pixel values of the edge blocks;

means for detecting a search grid having a minimum mean activity value among the multiplicity of search grids; and means for determining the detected search grid as the optimum search grid.

6. The apparatus as recited in claim 5, wherein said calculating means contains:

means for computing each activity value for each edge block in each search grid based on the pixel values of the edge blocks included in said each search grid, wherein each activity value for each edge block is calculated as:

$$AV = \frac{1}{M}\sum_{i=1}^{N}\sum_{j=1}^{N}(H(i,j)-m)^2$$

wherein M is the number of N×N pixels within an edge block, H(i,j) represents the pixel value at a pixel location(i,j) in the edge block, m is a mean pixel value of all the pixel values within the edge block and i and j are positive integers no larger than the integer N, respectively; and means for averaging all the activity values for all the edge blocks in the search grid to generate a mean activity value for the search grid.

7. The apparatus as recited in claim 6, wherein each of the search grids is shifted from each other on a pixel-by-pixel basis.

8. The apparatus as recited in claim 7, wherein the pixel value is a luminance level of a pixel.

* * * * *